United States Patent

Ryley et al.

[15] 3,700,789

[45] Oct. 24, 1972

[54] MISREGISTRATION CORRECTION FOR COLOR TELEVISION CAMERAS

[72] Inventors: Derek Vernon Ryley; Gyongyver Claydon, both of Essex, England

[73] Assignee: The Marconi Company Limited, London, England

[22] Filed: Sept. 23, 1970

[21] Appl. No.: 74,739

[30] Foreign Application Priority Data

Oct. 1, 1969 Great Britain..........48,168/69

[52] U.S. Cl. ............................................178/5.4 M

[51] Int. Cl...............................................H04n 9/00

[58] Field of Search.........................178/5.4 M, 5.4 R

[56] References Cited

UNITED STATES PATENTS 3,404,220 10/1968 Faureau .................178/5.4 M 2,594,382 4/1952 Bedford .................178/5.4 M 2,594,383 4/1952 Bedford .................178/5.4 M 3,471,634 10/1969 Clark ......................178/5.4 M 3,536,824 10/1970 Chmillon................178/5.4 M

*Primary Examiner*—Robert L. Griffin

*Assistant Examiner*—Donald E. Stout

*Attorney*—Baldwin, Wight & Brown

[57] ABSTRACT

A color television equipment has a plurality of component camera tubes and means for bringing the rasters of the tubes into registration one with another. The time interval between signals produced from each of a pair of tubes when that tube scans an oblique boundary on a test card is used to provide a correction signal to effect registration. Correction signals are derived to correct misregistration in both line and field directions.

7 Claims, 11 Drawing Figures

INVENTORS
Derek Vernon Ryley
and
Gyongyver Claydon
BY Baldwin Wight & Brown ATTORNEYS INVENTORS
Derek Vernon Ryley
and
Gyongyver Claydon
BY Baldwin Wight & Brown ATTORNEYS INVENTORS
Derek Vernon Ryley
and
Gyonggyver Claydon
BY Baldwin Wight & Brown ATTORNEYS

MISREGISTRATION CORRECTION FOR COLOR TELEVISION CAMERAS

This invention relates to color television cameras.

Color television cameras as at present in general use comprise a number of component tubes which "view" the same scene to produce video signals for transmission, each tube scanning the scene in the well known way with scanning lines which, in normal present day practice, are horizontal. In some cameras there are three component tubes, one each for the component colors red, green and blue, and luminance signals are derived by suitably combining, in well known way, the outputs from these tubes. In other cameras there are four component tubes, three being color signal tubes and the fourth being a luminance tube. In all cameras it is necessary to achieve a high degree of scanning registration, i.e., it is necessary that the scanning rasters of all the tubes shall be as nearly as possible identical and traced as nearly as possible simultaneously. This requirement is obviously difficult to satisfy and, as is well known, failure to do so results in degradation of the colored pictures reproduced by a receiver receiving and utilizing signals from the camera. Indeed it needs only quite small departures from correct registration for the pictures to be unacceptably poor. Very close and fine adjustments are necessary to achieve registration and even when correct adjustments are made, they are liable to be lost and fresh re-adjustments have to be made fairly often. This invention seeks to provide improved color television cameras which shall be such that, at any time required, automatic registration can be obtained, both in the line direction and in the field direction, and without the need for manual adjustment, by utilizing signals provided by the component tubes of the camera when said camera scans a predetermined pattern including at least one oblique boundary line separating areas of different color and/or different light and shade value. By "oblique boundary line" is meant a boundary line running obliquely with respect both to the scanning line direction and to the field direction. The expression "oblique boundary pattern test card" as employed hereinafter, means a test card having thereon a pattern which provides at least one color boundary line or light and shade boundary line which is oblique both to the scanning line direction and to the field direction. A preferred form of oblique boundary pattern test card is one having thereon at least one shape in the form of a right angled isosceles triangle with its base extending in the field direction and its right angled apex pointing towards that end of the scanned area from which the scanning lines start. Such a triangle provides, by the two sides which meet at the apex, two oblique boundary lines, both at 45° to the scanning line direction and therefore also the field direction, between two different colors or two different values of light and shade, dependent upon whether the triangle is differently colored from its background or has a different value of light and shade from the background, e.g., black on a white background or white on a black one.

According to this invention a color television camera equipment incorporating, in the camera thereof, a plurality of component camera tubes includes, for each pair of said tubes, means dependent on the time interval between two tube output signals, one from each tube, which are produced, when corresponding scanning lines, one in the raster of each tube, scan across an oblique boundary line on an oblique boundary line test card, for generating a first correcting signal; means dependent on the time interval between the two tube output signals, one from each tube, which are produced when corresponding later scanning lines, one in the raster of each tube, scan across an oblique boundary line of said test card, for generating a second correcting signal; and means for utilizing said correcting signals to modify the deflection in at least one of said tubes in the line and field directions so as to bring the rasters of the two tubes into registration.

Preferably each of the two means which are each dependent on a time interval between two output signals, is arranged to generate a correcting signal of one or other sign or sense in dependence upon the sign of sense of the time interval (if any) in question.

If a camera tube scans an oblique boundary test card its signal output will contain a sharp distinguishable step each time a line of its raster crosses a boundary line on the card. If two tubes scan the test card and the two tubes are scanning in correct register with one another, the distinguishable steps occurring in the signal outputs from the two tubes when the corresponding lines, one in the raster of each tube, cross an oblique boundary line, will obviously occur simultaneously. However if the two tubes are out of register in the line direction and/or in the field direction, the steps in the output signals of the two tubes will not occur simultaneously but there will be a time interval dependent jointly on the amounts of mis-registration in the two mutually perpendicular directions (line and field) between them. If correcting signals, representative of the above intervals, are generated and applied as error correcting signals to modify the line and field deflections in one of the tubes in relation to the other until the errors (i.e. the time intervals) disappear, registration will be achieved.

Preferably the correcting signals for modifying deflection are applied to modify deflection in the same tube. Though not theoretically essential this has the advantage that the tube, the deflection in which remains unmodified, can be used, as it were, as the reference not only for the other of the two tubes mentioned, but for each of the further tubes in the camera. Thus a three tube camera can be treated, for the purposes of this invention, as consisting of two pairs of tubes with one tube common to both and the invention applied to bring each of two of the tubes into register with the common tube.

Preferably each of two tubes to be brought into register with one another is arranged, when registration is required to be effected, to feed its signal output to a threshold level detector adapted, when the input thereto is below a predetermined level, to provide a digital output signal of one state and when said input is above said level, to provide a digital output signal of the other state; and the outputs from said detectors are employed to control two digital signal responsive systems one adapted to compare the timings of two like changes of digital output, one from each detector, occurring in corresponding lines of the rasters of both tubes and the other adapted to compare the timings of two like changes of digital output, one from each detector, occurring in later corresponding lines of the rasters of both tubes.

A preferred embodiment of this nature comprises a first digital system including a pair of bistables, means actuated by a pulse produced at the commencement of a first selected scanning line in one tube for setting said bistables into an initial state, means actuated upon change of state of one detector for changing the state of one of said pairs of bistables, means actuated upon change of state of the other detector for changing the state of the other of said pair of bistables, and a pair of gates connected to the pair of bistables and adapted to supply an output from one or other of said gates in dependence upon which of said pair of bistables changes state first; a second digital system also including a pair of bistables and a pair of gates and differing from the first in that the bistables of said second system are arranged to be set into their initial state by a pulse produced at the commencement of a second selected scanning line spaced in the field direction from the first and occurring later in the raster; a further pair of bistables one of which is adapted to be set into one or other state in dependence upon which of the two gates in the first digital system provides an output and the other of which is adapted to be set into one or other state in dependence upon which of the two gates in the second digital system provides an output; and line and field correction control circuits controlled by the further pair of bistables and adapted to modify the line deflection or the field deflection in one of the tubes in dependence upon whether the bistables of said further pair are in the same state or not.

Preferably the test card used has thereon a pattern comprising at least one right angled isosceles triangle with its base perpendicular to the line deflection direction and its apex towards that edge of the scanned area from which scanning lines commence and the aforesaid first and second selected lines are lines which intersect the perpendicular sides of the triangle at equal distances from the apex.

The invention is illustrated in and further explained in connection with the accompanying drawings in which.

Figure 1:
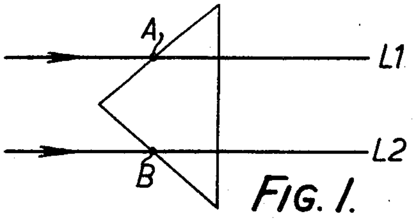
FIGS. 1 to 9 are explanatory diagrammatic figures.

When registration of the component tubes of a color TV camera is required to be effected automatically the camera is focussed on to a test card having a pattern including at least one line running obliquely with respect both to the scanning line direction and to the field direction and signals then obtained are used, by this invention, to effect registration. After registration has been achieved the camera can be used as in the ordinary way for color television transmission. If, after a time, the quality of the picture shows that re-registration is necessary, the camera can be swung back to the test card (or alternatively a test card can be inserted into the optical system of the camera) and correct registration again automatically established by this invention. For the purpose of describing how the invention operates it is sufficient to explain how two of the component tubes are brought into registration with one another for, obviously, any two component tubes can be brought into registration in the same way. Thus the invention is applicable to three or to four tube cameras: in the case of a three tube camera, for example, the three tubes can be treated, so far as registration is concerned, as two pairs of tubes with one tube common to both pairs. In explaining the operation of the invention there will first be considered what happens when scanning lines of the two tubes encounter a test card having thereon a pattern consisting of an isosceles triangle with base angles of 45° and which is different in color and/or shading from its background, its base being at right angles to the scanning line direction and its apex pointing in the direction opposite to that of line excursion. Such a triangle is represented in FIG. 1 in which L1 and L2 are two lines which cross the triangle in the direction indicated by the arrows at points A and B at the same distance from the apex of the triangle. The output signal wave form from a tube producing these lines L1 and L2 will show steps in the lines corresponding to points A and B.

Figure 2:
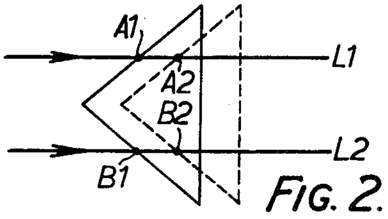
Figure 3:
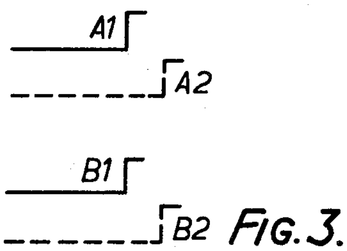

Now suppose the triangle to be scanned by the lines of two tubes 1 and 2 which should be in register but are actually out of register in the line direction with each line of tube 1 in advance of the corresponding line of tube 2. The two tubes are assumed to be in register in the field direction. With these assumptions made, the result will be as indicated in FIG. 2, i.e., it will be as though tube 1 were scanning the full line triangle of FIG. 2 and tube 2 were scanning the broken line triangle of that figure. In FIG. 2 A1 and B1 are the points on the full line triangle which correspond to A and B of FIG. 1 and A2 and B2 are the corresponding points on the broken line triangle. FIG. 3 shows the resultant signal wave outputs from the two tubes. The two line outputs from tube 1 will be as shown in full lines with steps referenced A1 and B1 at the same distance along the line and the two line outputs from tube 2 will be as shown in broken lines with steps referenced A2 and B2 occurring at times later by the same amount than the times at which the steps A1 respectively occur. The equal line direction displacement A1 – A2, B1 – B2 are a measure of the amount of misregistration in the line direction and the fact that the steps A1 and B1 occur respectively in advance of A2 and B2 gives the sense of the line direction misregistration, i.e., shows that tube 1 is in advance of tube 2. Therefore by deriving a correcting signal dependent on the sense of the displacements A1 – A2 and B1 – B2 and using this to control the line deflection in one of the two tubes until the displacements become zero, i.e., the correcting signal disappears, correct registration in the line direction can be automatically restored.

Figure 4:
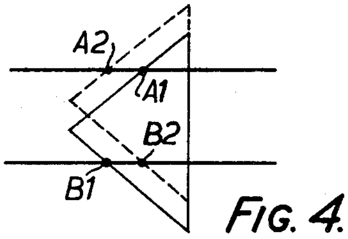
Figure 5:
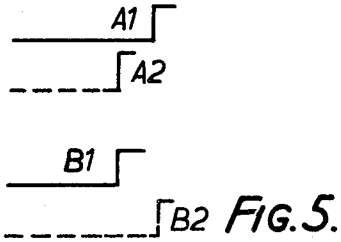

Now suppose the two tubes are in register in the line direction but out of register in the field direction, which is assumed to be vertically downwards. Then, because the sides of the triangle are oblique both to the line direction and to the field direction, there will again be line direction displacements between the steps produced in the output signal wave forms from the tube. This is shown in FIGS. 4 and 5 in the same manner as that adopted in FIGS. 2 and 3, the line crossing points of the triangle sides being again referenced A1 and B1 for tube 1 and A2 and B2 for tube 2. The steps in the tube outputs are shown in FIG. 4 with corresponding references A1 B1 and A2 B2. The equal line direction displacements A1 – A2 and B1 – B2 are a measure of the misregistration in the field direction and by deriving a correcting signal which is dependent upon whether A1 leads A2, or not, (and B1 leads B2, or not), and using it to control the deflection in the field direction in one of the two tubes correct registration in the field direction can be restored.

Figure 6:
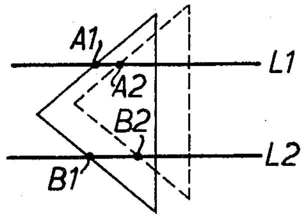
Figure 8:
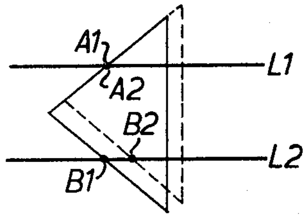
Figure 7:
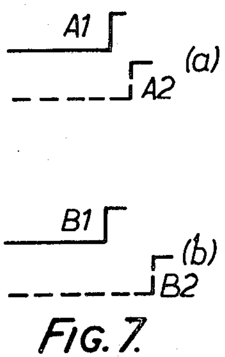
Figure 9:
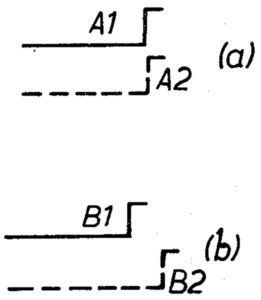

If there is misregistration in both line and field directions the situation will be as is shown in FIGS. 6 and 7 in the same manner as that adopted for the preceding figures. FIGS. 6 and 7 need little further description in view of that already given for the earlier figures. FIG. 6 is a diagram of the same nature as FIGS. 2 and 4 and FIG. 7(*a*) and (*b*) shows the displacements, in the line direction of the steps in the output wave forms of the two tubes, FIG. 7(*a*) showing the displacement due to the interval A1 – A2 and FIG. 7(*b*) showing the displacement due to the interval B1 – B2. By applying a correcting signal representative of the line direction displacements A1 – A2, B1 – B2 in FIG. 7(*a*) to control the line deflection in one of the two tubes until the signal disappears the line component of misregistration may be got rid of, leaving the position as shown (in the same manner as in FIGS. 6 and 7) in FIGS. 8 and 9(*a*) and (*b*) when the steps in the output signals will be displaced as shown in FIG. 9(*a* ) and (*b*). On reference to these figures it will be seen that there is now no displacement of the steps A1 and A2 in FIG. 9(*a*) but there is displacement of the steps B1 and B2 as shown in FIG. 9(*b*). By deriving a correcting signal representative of this displacement B1 – B2 of FIG. 9(*b*) and applying it to control the field deflection in one of the tubes until the signal disappears, correct registration, both in the line and field directions will be restored.

In the figures so far described the triangle sides intersected by the lines are at an equal angle (45°) to both the line and field directions. This angle is obviously not essential although equally obviously it is the best angle to adopt. Theoretically any angle will do so long as the sides are oblique to both line and field directions.

Figure 10:
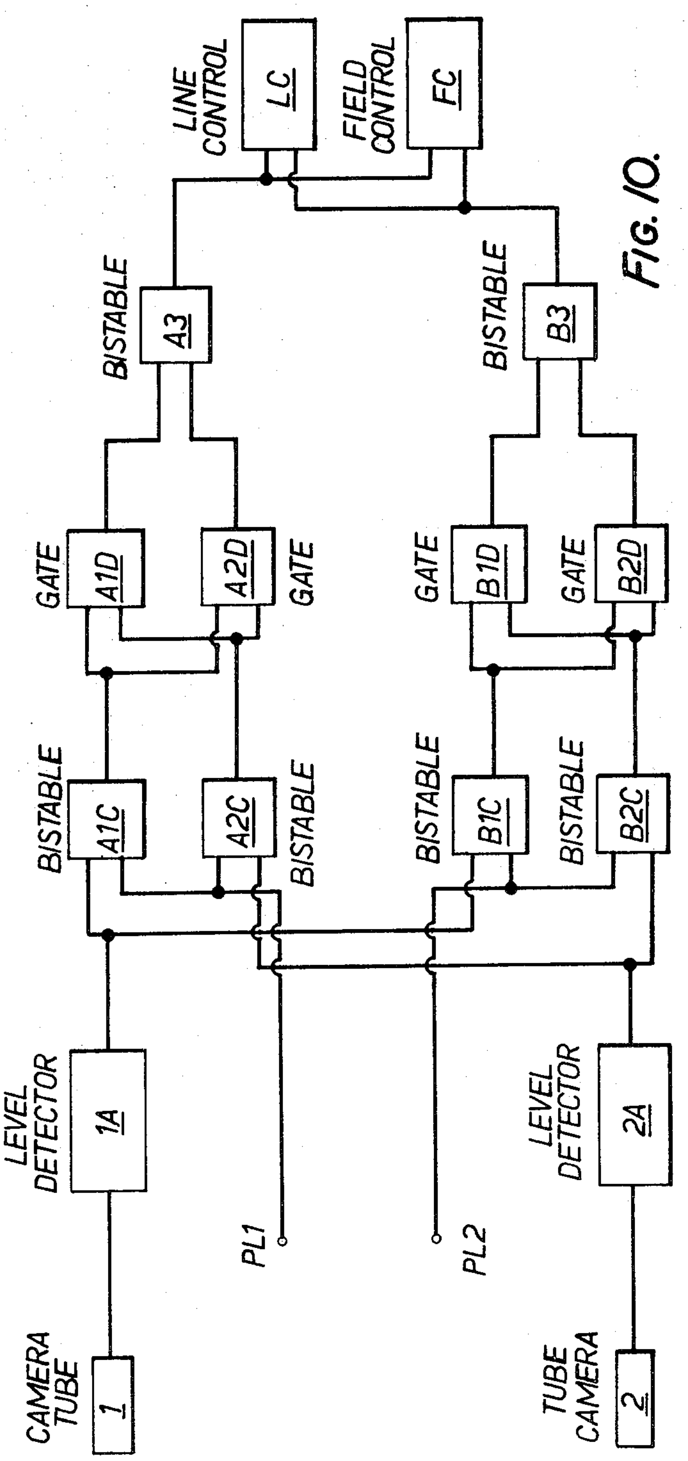
FIG. 10 is a simplified block diagram showing one embodiment so far as is necessary to an understanding thereof.

FIG. 10 is a block diagram showing so far as is necessary to an understanding thereof, one way of achieving automatic registration as above described in principle with the aid of FIGS. 1 to 9.

Referring to FIG. 10, 1 and 2 represent two of the component camera tubes in a color television camera which may be of any known type whether with three color tubes only (i.e. a three-tube camera) or three color tubes and a luminance tube (i.e. a four-tube camera). Apparatus like that now to be described for securing registration of the tubes 1 and 2 will be used, as will readily be understood, to secure registration of each pair of tubes in the camera, whether of the three-tube or of the four-tube type. The camera is normally employed in any well known way (with which the present invention is not concerned and the apparatus for which is not illustrated) but, when automatic registration is required, it is directed towards a test card having on it a pattern in the form of at least one isosceles triangle as shown in FIG. 1. Video outputs from the tubes 1 and 2 are fed to two level detectors 1A and 2A of any convenient known from adapted to produce a digital output of one state (e.g. 0) when the video input thereto is below a predetermined threshold value and of the other state (e.g. 1) when the video input thereto is above that threshold value. The threshold values for both level detectors is the same and may correspond with (about) the level representing mid grey. The blocks A1C A2C, A1D A2D are parts of a digital system the action of which is to compare the timings of the steps in the video wave form at point A (see FIG. 1) of the triangle on the test card. A1C and A2C are bistables each capable of adopting either of two states which will be referred to as states X and Y. A1C has one trigger input terminal fed from 1A and A2C has one trigger input terminal fed from 2A. The remaining trigger input terminals of A1C and A2C are fed in parallel from a terminal PL1 at which is produced, in any convenient known way (not shown), a pulse occurring at the beginning of the line L1 i.e., the line which passes through the point A of FIG. 1. This pulse sets A1C and A2C into state X. When the step occurs in the output from tube 1 due to this line intersecting the side of the triangle (at point A1 in FIG. 2 for example) the state of detector 1A changes and A1C switches over to state Y. Similarly when the corresponding step occurs in the output from tube 2 (at point A2 in FIG. 2 for example) detector 2A changes state and A2C goes over to the Y state. A1D and A2D are gates each having one input fed from A1C and the other from A2C and their outputs are respectively connected to the inputs of a further bistable A3 having two states X and Y. The gates are designed and constructed in known manner such that if step A1 leads step A2 an output is obtained from A1D to A3 while if A2 leads A1 an output is obtained from A2D to A3. In the former case the triggering input (from A1D) sets A3 to state X. In the latter case the triggering input (from A2D) sets A3 to state Y. The state of the output from A3 is thus representative of whether A1 leads or lags behind A2.

The parts B1C, B2C, B1D, B2D and B3 correspond in function, for line L2 and point B (FIG. 1) to the parts A1C, A2C, A1D, A2D and A3 respectively, the bistables B1C and B2C being set into their initial X state by a pulse which is produced at PL2 at the beginning of the line B of FIG. 1. Thus the state of the output from B3 is representative of whether B1 (FIG. 2 for example) leads or lags behind B2.

The units A3 and B3 connected as shown to line and field control circuit represented by blocks LC and FC respectively, which apply correcting control to means (not shown) providing line and field deflection, respectively, in one of the two tubes 1 and 2 - for example tube 2. The arrangement is such that line deflection correction is applied when A3 and B3 are in the same state and field deflection correction is applied when A3 and B3 are in opposite stages. The actual deflection corrections may be applied in any of a variety of ways which will suggest themselves to those skilled in the art and which form per se no part of this invention. For example deflection correction may be effectcd by motor driven potentiometers, the motors of which are controlled by LC (for line deflection correction) and FC (for field deflection correction) and which vary suitable parameters of the scanning system of the tube (above assumed to be tube 2) to which the correction is to be applied. The corrections for registration may be applied either by controlling a number of parameters of the tube scanning system e.g., horizontal (line) and vertical (field) centring, scanned area width and height, horizontal and vertical linearity of deflection, skew and twist or by generating dynamic correction waveforms which modify the line and field deflection current waveforms as necessary to secure registration. Instead of using motor driven potentiometers digital or analogue integrating and storage systems could be employed but the use of motor driven means is preferred because, with such means, the registration correction settings last obtained are automatically retained until a further automatic registration operation is performed.

Figure 11:
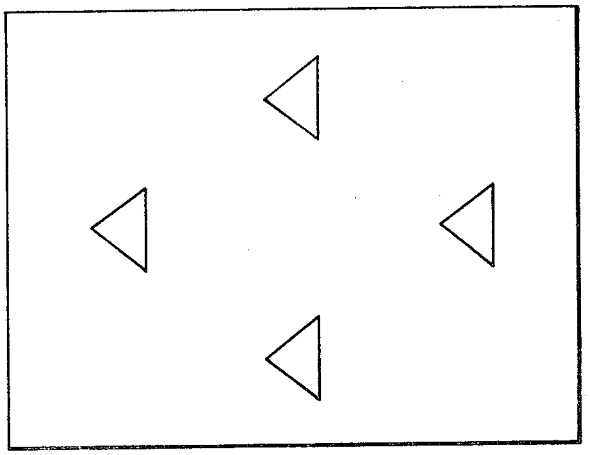
FIG. 11 shows one form of test card which can be used in carrying out the invention.

Registration may be carried out over a large area of the picture by using a test card, such as that of FIG. 11 in which the test card pattern adopted (for example the isosceles triangle of FIG. 1) is repeated a number of times over the whole picture area. In FIG. 11 there are four triangles disposed as shown, each having its base at right angles to the line direction which is assumed to be from left to right in FIG. 11. Such a card of four triangles could be used for the obtaining of control of four horizontal and four vertical scanning system parameters e.g., (1) horizontal and vertical centring (2) height and width (3) horizontal and vertical linearities and (4) skew and twist.

Alternatively signals representative of registration errors at a large number of points on the picture area could be obtained and used to generate dynamic correction waveforms for addition to the normally provided horizontal and vertical deflection waveforms so as to modify the latter as necessary to secure registration over the whole picture area.

The logic involved in conjunction with the circuit of FIG. 10 has been set forth above. There would be, of course, many ways in which to implement this logic. For example, the various bistable devices may take the well known form of cross-coupled NAND gates which operate in general like an R-S flip-flop. This type of bistable circuit is described, for example, in the Marconi-Elliot Microelectronics Applications Handbook, Digital Integrated Circuits 9930 Series, at page 53. The gates shown in FIG. 10 may simply be conventional NAND gates. The truth tables for the individual NAND gates of the bistables or for the NAND gates A1D, A2D, B1D and B2D are of course well known as set forth, for example at page 96 of the above application.

The circuits LC and FC of FIG. 10 simply perform the above described logic with respect to the outputs of the bistables A3 and B3. For example, it is evident from FIG. 10 that there are four possible input conditions for each of the circuits LC and FC. They are, respectively, as follows:

| Bistable A3 | Bistable B3 |
|---|---|
| low | low |
| high | low |
| low | high |
| high | high |

From the description above, it will be recognized that for a cross-coupled NAND constituting both bistables A3 and B3, the X state of each bistable corresponds to a "high" input to the circuits LC and FC while the Y state corresponds to "low" inputs to the circuits LC and FC. Using the symbols X and Y for the "low " and "high" inputs above, the four unique inputs to the circuits LC and FC may be written:

X,X
Y,X
X,Y
Y,Y

Using the arbitrary notion with respect to FIGS. 2 and 4 that when $A_1$ leads $A_2$ one needs to move the dashed line triangle to the left in order to obtain registration; that when $A_2$ leads $A_1$ one needs to move to the right; that when $B_1$ leads $B_2$ one needs to move the dashed line triangle down in order to obtain registration; and that when $B_2$ leads $B_1$ one needs to move up, it is obvious that the four above unique inputs to the circuits LC and FC define the necessary conditions to effect registration.

For example, consider the case shown in FIG. 2. In this instance, the inputs to the circuits LC and FC are X,X. Clearly, the circuit FC should not respond since no field misregistration is present, but the circuit LC should respond to effect left movement in the above sense. Similarly, for FIG. 4, the inputs to the circuits LC and FC will be Y,X and the circuit FC only should respond to effect down movement in the above sense.

Obviously, the movements necessary to correct all conceivable conditions of misregistration which can occur are as follows:

| | |
|---|---|
| left only (FIG. 2) | X,X |
| right only | Y,Y |
| down only (FIG. 4) | Y,X |
| up only | X,Y |
| left and down | X,X;Y,X |
| left and up | X,X;X,Y |
| right and down | Y,Y;Y,X |
| right and up | X,Y;Y,Y |

From this, it is clear that each circuit LC or FC requires only that it contain logic circuitry responsive to that number of the above possible inputs which would effect the requisite combination of movements necessary to achieve registration. For example, a simple way to implement LC and FC is to have the circuit LC respond to effect left movement only when the input condition X,X prevails and to effect right movement only when the input condition Y,Y prevails and to effect no movement under any other input condition. Then, the circuit FC is implemented to effect up movement only when the input condition X,Y prevails and to effect down movement only when the input condition Y,X prevails and to effect no movement under any other input conditions, whereby any and all conditions of misregistration will be corrected.

Under these circumstances, the logic function to be performed by the circuit LC may simply be implemented by means of a NAND gate in parallel with a NOR gate whose truth tables as conventional would be:

| inputs 1 2 | NAND out | NOR out |
|---|---|---|
| X X | 0 | 1 |
| X Y | 0 | 0 |
| Y X | 0 | 0 |
| Y Y | 1 | 0 |

Similarly, the logic performed by the circuit FC may be implemented simply as the output of an EXCLUSIVE OR circuit whose conventional truth table would be:

| Inputs 1 2 | EX. OR out |
|---|---|
| X X | 0 |
| X Y | 1 |
| Y X | 1 |
| Y Y | 0 |

It will be recognized that all logic operations specified above are strait forward Boolean logic manipulations in accord with well known texts, as for example Transistor Logic Circuits by Richard B. Hurley, John Wiley and Sons, 1961, Library of Congress Catalog Card No. 61–11518.

Clearly, the system for performing the necessary logic to effect the end result desired as is shown in the preferred embodiment of FIG. 10 is but one method of effecting this end result. Other and entirely different arrangements for arriving at the same end result could be used.

We claim:

1. A color television camera equipment incorporating, in the camera thereof, a plurality of component camera tubes, said equipment providing horizontal and vertical registration for the rasters of the said tubes and including for each pair of tubes signal level detection means for detecting, for the two tubes in each pair, when scanning lines scan across one straight boundary line of an oblique boundary line test card; gating means for providing a first correcting signal representative of the order in which scanning lines of the pair of tubes cross said one boundary line; signal level detection means for detecting, for the said two tubes, when corresponding later scanning lines of the pair of tubes scan across another straight boundary line of an oblique boundary line test card in which said another boundary line has a slope different from that of said one boundary line; gating means for providing a second correcting signal representative of the order in which scanning lines cross said another boundary line; and comparison means for comparing said further first and second correcting signals, and means for modifying in dependence on said comparison the deflection in at least one of said two tubes in the line and field directions so as to bring the rasters of the two tubes into horizontal and vertical registration.

2. An equipment as claimed in claim 1 wherein each of two tubes to be brought into register with one another is arranged, when registration is required to be effected, to feed signal output to a threshold level detector adapted, when the input thereto is below a predetermined level, to provide a digital output signal of one state and when said input is above said level, to provide a digital output signal of the other state; and the outputs from said detectors are employed to control two digital signal responsive systems one adapted to compare the timings of two like changes of digital output, one from each detector, occurring in corresponding lines of the rasters of both tubes and the other adapted to compare the timings of two like changes of digital output, one from each detector, occurring in later corresponding lines of the rasters of both tubes.

3. An equipment as claimed in claim 1 and comprising a first digital system including a pair of bistables, means actuated by a pulse produced at the commencement of a first selected scanning line in one tube for setting said bistables into an initial state, means actuated upon change of state of one detector for changing the state of one of said pairs of bistables, means actuated upon change of state of the other detector for changing the state of the other of said pair of bistables, and a pair of gates connected to the pair of bistables and adapted to supply an output from one or other of said gates in dependence upon which of said pair of bistables changes state first; a second digital system also including a pair of bistables and a pair of gates and differing from the first in that the bistables of said second system are arranged to be set into their initial state by a pulse produced at the commencement of a second selected scanning line spaced in the field direction from the first and occurring later in the raster; a further pair of bistables one of which is adapted to be set into one or other state in dependence upon which of the two gates in the first digital system provides an output and the other of which is adapted to be set into one or other state in dependence upon which of the two gates in the second digital system provides an output; and line and field correction control circuits controlled by the further pair of bistables and adapted to modify the line deflection or the field deflection in one of the tubes in dependence upon whether the bistables or said further pair are in the same state or not.

4. For use with an equipment as claimed in claim 3 a test card having thereon a pattern comprising at least one right angled isosceles triangle with its base perpendicular to the line deflection direction and its apex towards that edge of the scanned area from which scanning lines commence and the aforesaid first and second selected lines are lines which intersect the perpendicular sides of the triangle at equal distances from the apex.

5. An equipment as claimed in claim 1 wherein each of the said gating means is arranged to generate a correction signal having one of two predetermined values, one value being representative of one said order, and the other value being representative of the other said order.

6. In a color television camera system employing at least a pair of component camera tubes in which the rasters thereof may be misaligned both in the line and field directions, the combination of:

first means for determining from single corresponding line scans of the pair of camera tubes the order of occurrence of scanning across one straight boundary line presented in common to such tubes, said one boundary line forming an oblique angle between the boundary line and the scanning line direction;

second means for determining from single corresponding line scans of the pair of camera tubes the order of occurrence of scanning across another straight boundary line presented in common to such tubes, said another boundary line forming an oblique angle between it and the scanning line direction and intersecting said one boundary line; and means responsive only to said orders of occurrence for bringing said rasters into alignment in both the line and field directions.

7. In a color television camera system as defined in claim 6 wherein said first and second means comprise interconnected logic circuits including a pair of bistable output members, one having one output state in response to one order of occurrences determined by said first means and an opposite output state in response to the opposite order of occurrences determined by said first means and the other bistable output member likewise having one output state and an opposite output state in response respectively to one order of occurrences and the opposite order of occurrences determined by said second means.

* * * * *